United States Patent
Levy

(10) Patent No.: US 8,339,508 B2
(45) Date of Patent: Dec. 25, 2012

(54) METHOD AND APPARATUS FOR LOW-LIGHT IMAGING ENHANCEMENT

(75) Inventor: Noam Levy, Karmiel (IL)

(73) Assignee: CSR Technology Inc., San Jose, CA (US)

( * ) Notice: Subject to any disclaimer, the term of this patent is extended or adjusted under 35 U.S.C. 154(b) by 254 days.

(21) Appl. No.: 12/834,297

(22) Filed: Jul. 12, 2010

(65) Prior Publication Data

US 2011/0205395 A1    Aug. 25, 2011

Related U.S. Application Data

(60) Provisional application No. 61/306,893, filed on Feb. 22, 2010.

(51) Int. Cl.
*H04N 5/222* (2006.01)
(52) U.S. Cl. .............. 348/370; 348/222.1; 382/274
(58) Field of Classification Search ............. None
See application file for complete search history.

(56) References Cited

U.S. PATENT DOCUMENTS

| | | | |
|---|---|---|---|
| 7,002,624 B1* | 2/2006 | Uchino et al. ............. | 348/225.1 |
| 7,457,477 B2 | 11/2008 | Petschnigg et al. | |
| 2002/0150306 A1* | 10/2002 | Baron ............. | 382/275 |
| 2003/0197708 A1 | 10/2003 | Frisken et al. | |
| 2004/0046875 A1* | 3/2004 | Itani et al. ............. | 348/229.1 |
| 2004/0145674 A1* | 7/2004 | Hoppe et al. ............. | 348/371 |
| 2005/0093997 A1* | 5/2005 | Dalton et al. ............. | 348/227.1 |
| 2005/0190288 A1* | 9/2005 | Yamada ............. | 348/371 |
| 2005/0243175 A1* | 11/2005 | Yamada et al. ............. | 348/207.1 |
| 2006/0008171 A1* | 1/2006 | Petschnigg et al. ............. | 382/254 |
| 2006/0033835 A1* | 2/2006 | Pollard et al. ............. | 348/370 |
| 2006/0050335 A1* | 3/2006 | Dorrell et al. ............. | 358/516 |
| 2006/0132642 A1* | 6/2006 | Hosaka et al. ............. | 348/370 |
| 2007/0024742 A1* | 2/2007 | Raskar et al. ............. | 348/370 |
| 2007/0025717 A1 | 2/2007 | Raskar et al. | |
| 2007/0201853 A1* | 8/2007 | Petschnigg ............. | 396/155 |
| 2007/0262236 A1 | 11/2007 | Pertsel | |
| 2008/0291288 A1 | 11/2008 | Tzur et al. | |
| 2008/0291330 A1 | 11/2008 | Vakrat et al. | |
| 2010/0080550 A1* | 4/2010 | Fujiwara ............. | 396/165 |

(Continued)

OTHER PUBLICATIONS

Barrow H.G., Tenenbaum, J.M., 1978. Recovering Intrinsic Scene Characteristics from Images. In Computer vision Systems, Academic Press, New York, pp. 3-26.

(Continued)

*Primary Examiner* — Nelson D. Hernández Hernández
*Assistant Examiner* — Dennis Hogue
(74) *Attorney, Agent, or Firm* — Frommer Lawrence & Haug LLP; John W. Branch

(57) ABSTRACT

A device and methods are provided for low-light imaging enhancement by a digital imaging device. In one embodiment, a method includes detecting an image associated with ambient lighting of a scene, detecting an image associated with artificial lighting of the scene, aligning the image associated with ambient lighting relative to the image associated with artificial lighting based on a motion parameter of ambient lighting image data and artificial lighting image data, and calculating data for a combined image based on aligned ambient lighting image data and artificial lighting image data, wherein image data for the combined image is selected to maximize an objective quality criterion of the combined image. The method may further include determining an image parameter based on ambient lighting image data, blending image data associated with the artificial lighting and the combined image based on the image parameter to generate a tone rendered image.

30 Claims, 5 Drawing Sheets

U.S. PATENT DOCUMENTS

2010/0245609 A1* 9/2010 Estevez ............... 348/222.1

OTHER PUBLICATIONS

Durand F., Dorsey J., 2002. Fast Bilateral Filtering for the Display of High-Dynamic-Range Images. Proceedings of ACM SIGGRAPH 2002, pp. 257-266.

Eisemann E., Durand F., 2004. Flash Photography Enhacement via Intrinsic Relighting. Proceedings of ACM SIGGRAPH Aug. 2004, pp. 673-678.

Faraji H., MacLean W.J., CCD Noise Removal in Digital Images, in IEEE Transactions on Image Processing, vol. 15, No. 9, Sep. 2006, pp. 2676-2685.

Fischler, M.A., Bolles R.C., 1982. Random Sample Consensus: A Paradigm for Model Fitting with Applications to Image Analysis and Automated Cartography, Communication of the ACM, vol. 24, issue 6, pp. 381-395.

Janesick J.R., 2001. Scientific Charge-Coupled Devices, ISBN 0-8194-3698-4, SPIE, Bellingham Washington.

Petschnigg G., Agrawala M., Hoppe H., Szeliski R., Cohen M., Toyama K., 2004. Digital Photography with Flash and No-Flash Image Parts. Proceedings of ACM SIGGRAPH Aug. 2004, pp. 664-672.

Tomasi C., Manduchi R., 1998. Bilateral filtering for gray and color images. Proc IEEE Int. Conf. on Computer Vision, pp. 836-846.

International Search Report and Written Opinion, dated Sep. 10, 2010, PCT/US2010/041990.

* cited by examiner

METHOD AND APPARATUS FOR LOW-LIGHT IMAGING ENHANCEMENT

CROSS-REFERENCE TO RELATED APPLICATION

This application claims the benefit of U.S. Provisional Application No. 61/306,893, filed Feb. 22, 2010.

FIELD OF THE INVENTION

The present invention relates in general to methods for imaging and in particular to enhancing low-light image capture.

BACKGROUND

Conventional methods for image capture in low-light typically employ one or more corrective measures to properly detect a scene. For example, handheld cameras typically apply high gain to image data captured of a low-light scene. Applying high gain, however, amplifies electronic and photonic noise in additional to amplifying the image signal. As a result, images captured in low-light can appear noisy and contain less high frequency content (e.g., details) due to amplification of the noise. One conventional solution is to introduce additional light to a scene by activating a flash of the camera during capture. This will result in a brighter scene, and can allow for gain to be lowered for capturing image data. However, images captured with flash can produce a harsh flat appearance resulting from the direct lighting. Additionally flash can change the detected color of a scene and cause near objects to appear significantly brighter than far objects. As a result, many artifacts not visible to the naked eye, can appear in image data captured for the scene.

Another approach is to utilize alternative flash arrangements, such as a diffuse flash or indirect flash, to soften the appearance of artificial light. Flash warming filters may be applied to modify the color of the flash's light. However, these solutions are not well suited for compact imaging devices, like portable cameras only having a single flash, wherein the flash is usually embedded in the body and is not adjustable.

Another approach employs digital processing of image data. For example, the digital processing approaches described in Digital Photography with Flash and No-Flash Image Pairs, Petschnigg et al., 2004, and Photography Enhancement via Intrinsic Relighting, Eisemann and Durand, 2004, digitally separate the flash and ambient images to light and detail layers (using adaptive filtering tools like the bilateral filter). These methods, however, take details undiscernibly from the image data resulting in the introduction of additional digital noise to the scene in parts of where the flash image is very dark or (conversely) over-saturated. Accordingly, there exists a desire to correct one or more of the aforementioned drawbacks.

BRIEF SUMMARY OF THE INVENTION

Disclosed and claimed herein are a device and methods for low-light imaging enhancement by a digital imaging device. In one embodiment, a method includes: detecting an image, by the digital imaging device, associated with ambient lighting of a scene, detecting an image, by the digital imaging device, associated with artificial lighting of the scene, aligning the image associated with ambient lighting relative to the image associated with artificial lighting based on a motion parameter of ambient lighting image data and artificial lighting image data, and calculating data for a combined image based on aligned ambient lighting image data and artificial lighting image data, wherein image data for the combined image is selected to maximize an objective quality criterion of the combined image. The method may further include determining an image parameter based on the ambient lighting image data, blending image data associated with the artificial lighting image and the combined image based on the image parameter to generate a tone rendered image, and storing, by the digital imaging device, the tone rendered image.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF EXEMPLARY EMBODIMENTS

Overview and Terminology

Figure 2:
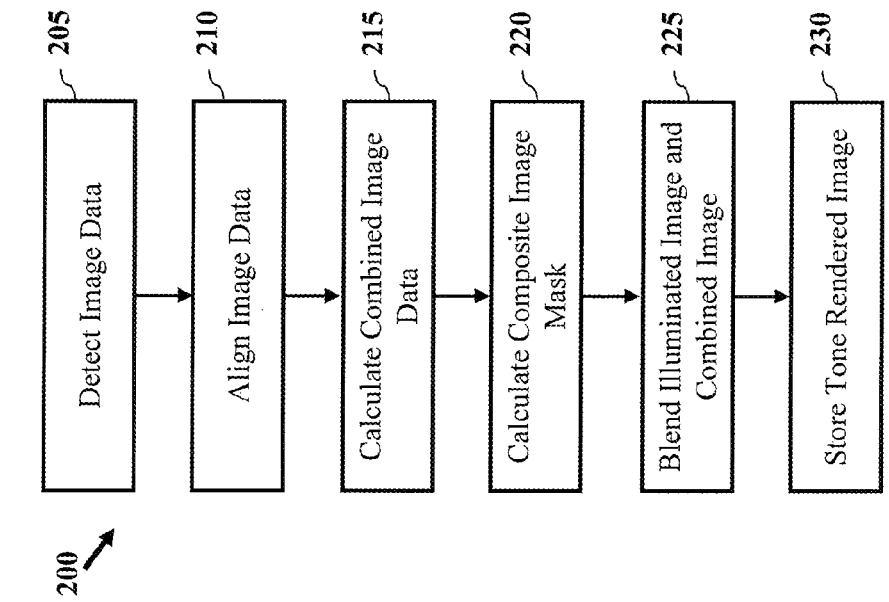
FIG. 2 depicts a process for image enhancement by an imaging device according to one or more embodiments of the invention.

One aspect of the present invention relates to enhancing low-light image data capture. In one embodiment, process is provided for enhancement including detecting image data associated with ambient lighting of a scene, and detecting image data with artificial illumination or lighting (e.g., flash) of a scene. The process may include alignment of the captured image data, and calculation of a composite image. The process may further include determining an image parameter, such as a composite mask, and blending image data associate with image data captured with artificial light, and the composite image based on an image parameter, such as a masking image. As such, details may be selected from one or more of the image data captured using ambient light and image data captured based on artificial illumination. In addition, tone rendered blending of composite image data may be employed to optimize combination of image data.

In another embodiment, an imaging device is provided to capture of image data associated with ambient light and artificial light to enhance captured image data. The imaging device, such as a digital camera, may be configured to determine one or more corrections for image data.

As used herein, the terms "a" or "an" shall mean one or more than one. The term "plurality" shall mean two or more than two. The term "another" is defined as a second or more.

The terms "including" and/or "having" are open ended (e.g., comprising). The term "or" as used herein is to be interpreted as inclusive or meaning any one or any combination. Therefore, "A, B or C" means any of the following: A; B; C; A and B; A and C; B and C; A, B and C. An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner on one or more embodiments without limitation.

In accordance with the practices of persons skilled in the art of digital image processing and analysis, the invention is described below with reference to operations that can be performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits When implemented in software, the elements of the invention are essentially the code segments to perform the necessary tasks. The code segments can be stored in a "processor storage medium," which includes any medium that can store information. Examples of the processor storage medium include an electronic circuit, a semiconductor memory device, a ROM, a flash memory or other non-volatile memory, a floppy diskette, a CD-ROM, an optical disk, a hard disk, etc.

Exemplary Embodiments

Figure 1:
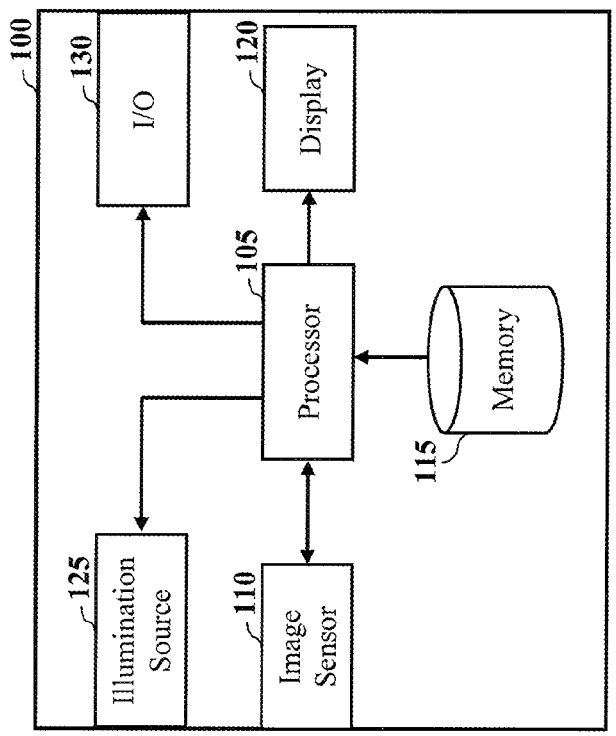
FIG. 1 depicts a simplified block diagram of an imaging device according to one embodiment of the invention.

Referring now to the figures, FIG. 1 depicts a simplified block diagram of an imaging device according to one embodiment of the invention. As depicted imaging device 100 includes processor 105 coupled to image sensor 110, memory 115, and display 120. Image sensor 110 may relate to a combination of an optical lens and light detection circuitry (e.g., CMOS integrated circuit, charge coupled device (CCD), etc.). Image data detected by image sensor 110 may be provided to processor 105, including image data detected for generating a preview image.

Processor 105 may be implemented using one of an integrated circuit microprocessor, microcontroller, digital signal processor and processor in general. Processor 105 may be configured to process received image data based on, for example, specific image processing algorithms stored in memory 115 in the form of processor-executable instructions. In addition, processor 105 may be configured to control exposure parameters, such as exposure periods, focus depth, etc. In certain embodiments, processor 105 may be configured to control one or more components of imaging device 100 including image sensor 110 and illumination source 125. Illumination source 125 may relate to an artificial illumination source, such as an electronic flash integrated with imaging device 100.

In on embodiment, image data processed by processor 105 may be stored in memory 115 and/or provided to display 120 for viewing. It should be appreciated that memory 115 may relate to any combination of different memory storage devices, such as a hard drive, random access memory (RAM), read only memory (ROM), flash memory, or any other type of volatile and/or nonvolatile memory. It should further be appreciated that memory 115 may be implemented as multiple or discrete memories for storing processed image data, as well as the processor-executable instructions for processing the captured image data. Further, memory 115 may include removable memory, such as flash memory, for storage of image data.

Display 120 may relate to a liquid crystal display (LCD) incorporated into digital camera 100 for display of captured image data. Alternatively, it should be appreciated that an external display device may be coupled to imaging device 100 for display.

According to one embodiment of the invention, imaging device 100 may be configured to enhance image data captured in low-light. In addition to the conventional methods for generating artificial light, (e.g., a flash), imaging device 100 may be configured to enhance image data based on image data captured for a scene associated with ambient light and/or artificial light generated by illumination source 125. Illumination source 125 may be configured to emit a short burst of light based on user activation of the Input/Output (I/O) 130 (e.g., user triggering of a capture button). Light emitted by illumination source 120 may illuminate a scene for the fraction of a second during image capture. It may also be appreciated that illumination source 120 may be configured to provide a wide variety of flash signals, including one or more bursts of light associated with one or more output levels. I/O 130 may relate to one or more buttons or terminals of the imaging device for adjusting user settings and/or communication data by the imaging device.

Although FIG. 1 has been described above with respect to an imaging device, it should be appreciated that the device may relate to other devices, and/or be included in other devices, such as a mobile communication device and portable communication device in general, etc.

Referring now to FIG. 2, a process is depicted for low-light image enhancement by an imaging device according to one or more embodiments of the invention. Process 200 may be performed by one or more elements of the device of FIG. 1 (e.g., imaging device 100), such as a processor (e.g., processor 105). Process 200 may employed for enhancing image data detected for low-light image capture. As depicted in FIG. 2, process 200 may be initiated by detecting image data at block 205. In one embodiment, image data is detected by the imaging device associated with the ambient light of a scene (e.g., no artificial light, or flash, generated by the imaging device). Ambient image data detected by the imaging device may relate to image data detected by the imaging device to provide a preview image for the user via a display (e.g., display 120). Image data detected by the imaging device may additionally include detection of image data associated with artificial lighting of a scene, such as a flash emitted by the imaging device. In one embodiment, image data associated with ambient lighting of the scene is captured prior to capture of image data with artificial illumination. However, it may also be appreciated that image data detect at block 205 may include image data associated with ambient lighting captured following image capture with artificial illumination. As will be discussed below, image data detected by the imaging device of a scene and utilized by process 200 may be based on two images, a first associated with ambient lighting and second associated with artificial illumination (e.g., flash). It should also be appreciated that process 200 may include detection of additional images of a scene. For example, third and fourth images, associated with ambient lighting and artificial lighting, respectively may be detected as will be described below in more detail with respect to FIG. 3.

In contrast to conventional methods of low-light image enhancement which do not align image data due to complexity of image data with varied illumination levels and noise level of ambient image data, alignment of the image data at block 210 may be provided according to one embodiment. At block 210, image data detected by the imaging device may be aligned to allow for disparities in image data to be accounted for due to delay in capturing image data. In one embodiment, aligning may relate to aligning a first image relative to a second image, wherein the first image relates to image data captured with ambient lighting and the second image relates to image data detected with artificial illumination by the imaging device. Image alignment may be based on a motion estimation algorithm such as the motion estimation algorithm methods described in commonly assigned patent publication no. US 2008/0291330 A1 titled Technique of Motion Estimation When Acquiring An Image of A Scene That May Be Illuminated With A Time Varying Luminance, which is hereby fully incorporated by reference. In one embodiment the motion estimation algorithm employed for image alignment at block 210 may relate to motion estimation invariant to scene illumination to align frames. In certain embodiments, the imaging device may provide an indication when alignment of image data may not be provided as will be described below in more detail with reference to FIG. 3.

At block 215, a combined image may be calculated based on the detected image data. One advantage of the invention may be to utilize details from image data of either of the ambient image and illuminated/flash image, in contrast to conventional methods which only utilize image detected with flash. As will be discussed in more detail below with respect to FIG. 5, combined image data may be calculated to create an optimal combined image to include illumination details associated with image data of the ambient image and illuminated image, and to maximize detail and minimize noise. In one embodiment, image data for the combined image is selected to maximize an objective quality criterion of the combined image. For example, the objective quality criterion may relate to signal to noise ration.

In certain instances, combined, image data may appear unnatural or flat. Accordingly, combined image data may be blended with image data associated with artificial illumination to generate a continuous flash effect in one embodiment. For example, enhancement of image data to correct for a flat or unpleasant appearance of artificial light on image details. In one embodiment, process 200 may include determine a compositing mask at block 220 to blend image data associated with the illuminated image with combined image data at block 225. In order to selectively correct for unpleasing areas of image data, portions of the image data which do not have a pleasing appearance may be replaced to generate an optimal tone rendered result at block 225. Thus, blending image data at block 225 can localize the correction only to required regions. Based on the blending of image data, the digital imaging device may store a tone rendered result at block 230.

Figure 3:
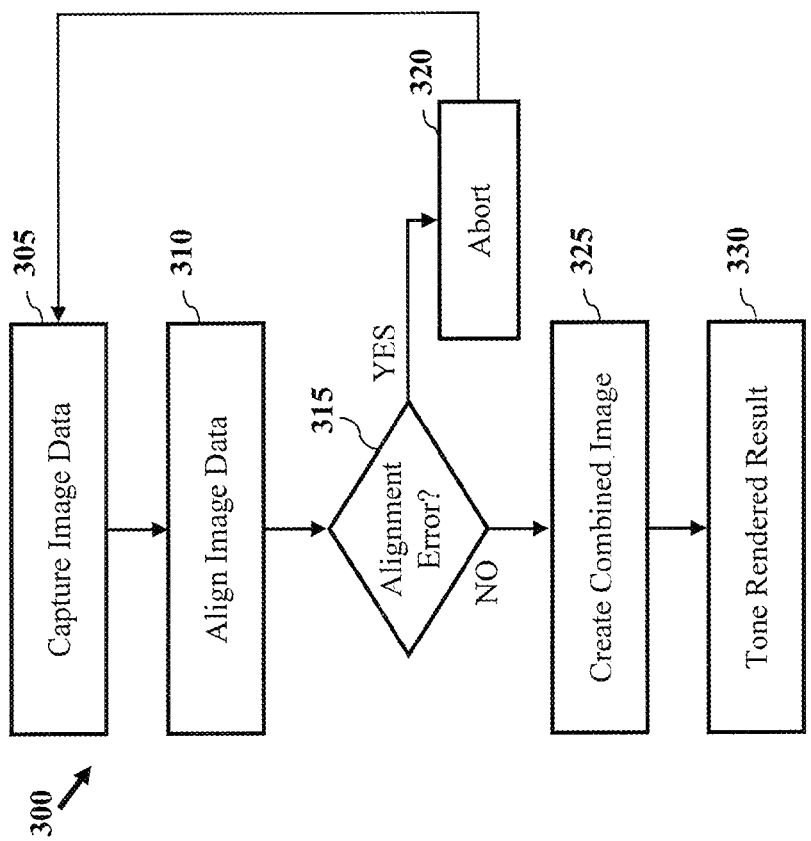
FIG. 3 depicts a process for image enhancement by an imaging device according to another embodiment of the invention.

Referring now to FIG. 3, a process is depicted for low-light imaging enhancement according to another embodiment. Process 300 may be performed by a processor of an imaging device (e.g., imaging device 100) according to one embodiment. Process 300 may allow for aborting enhancement of image data when alignment of detected images may not be performed, or when said alignment process fails. Process 300 may be initiated by detecting image data at block 305, such as image data associated with ambient light of a scene and image data associated with artificial lighting of a scene, such as a flash emitted by the imaging device. At block 310, the processor of the imaging device may align image data. The processor may then check the alignment of the image data at decision block 315. When alignment of the image data produces an alignment error (e.g., "YES" path out of decision block 315) process 300 may abort the enhancement of detect image data at block 320. For example, the process 300 processor may abort image enhancement when it is detected that significant areas of the image exhibit local misalignment as will be discussed in more detail below with respect to FIG. 4. In certain embodiments, process 300 may display a message to a user of the imaging device that captured image data resulted in an error. Alternatively, one of the source images (such as the flash image), may substitute the result of the process 330 in these instances. Alternatively, or in combination, the imaging device may prompt the user to capture another image of the scene. Accordingly, process 300 may capture image data as depicted at block 305, such as third and fourth additional frames.

When image data does not result in an alignment error ("NO" path out of decision block 315), process 300 may then create a combined image at block 325. Process 300 may then calculate a tone rendered image at block 330 based, at least in part, on image data detected at block 305.

Figure 4:
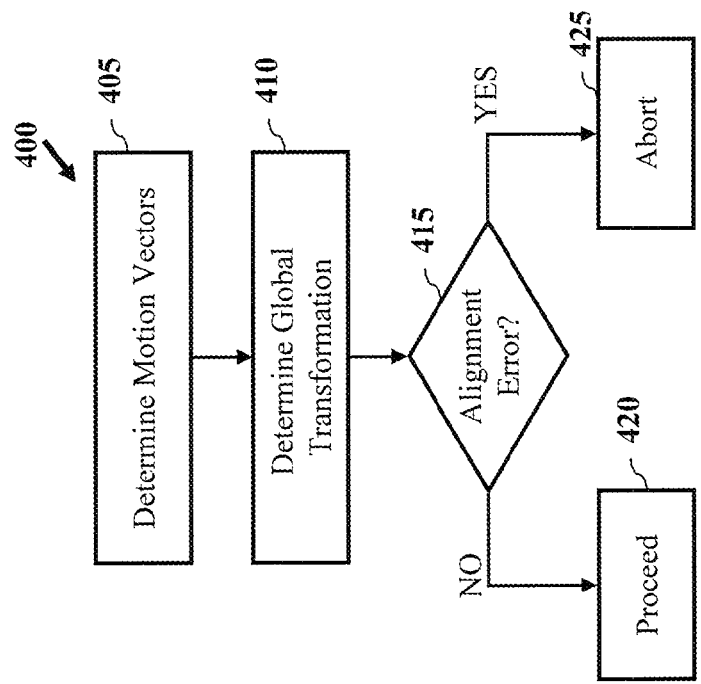
FIG. 4 depicts a process for aligning image data according to one embodiment of the invention.

Referring now to FIG. 4, a process is depicted for detecting alignment errors according to one embodiment. Because image data employed for image enhancement (e.g., image data detected at blocks 205 and 305) is not captured at the same instant, motion of the imaging device, such as user hand shake, can cause undesirable artifacts in combined image data. In one embodiment, image data is aligned by calculating motion of image content between frames. Inverse motion may be applied to one image frame in order to compensate for motion according to one embodiment.

Local alignment errors may be caused when an object in a scene is moving quickly. In certain instances, alignment of image data for global motion, such as camera shake, may not compensate for local movement. According to one embodiment, local motion may be detected by searching for an area of the image which includes motion after compensation for global motion. When significant areas in the image exhibit local misalignment, enhancement of image data may be aborted or the region of image data may be replaced. Process 400 provides for estimation of motion and a global transformation. In one embodiment, process 400 may estimate global transformation based on a statistical estimation algorithm, such as Random Sample Consensus Algorithm (RANSAC).

Process 400 may be initiated by determining one or more motion vectors at block 405. Motion vectors may be determined for a plurality of points in the image. In one embodiment, motion vectors may be randomly selected. By way of example, a set of point and motion vectors detected for a point in first and second images (e.g., ambient and illuminated images) may be characterized as:

$$\{(x_i, y_i, u_i, v_i)\}_{i=1}^{N}$$

wherein $(x_i, y_i)$ relates to the point in coordinates matching the point in coordinates $(x_i+u_i, y_i+u_i)$ in the ambient frame.

From a set of correspondences, a global estimation may be determined at block 410. In one embodiment, the global transformation may be an estimation such as:

$$T_{global}: \mathbf{R}^2 \to \mathbf{R}^2$$

In one embodiment, the global transformation may be applied to every point in the artificially illuminated frame. Using a robust statistics algorithm, such as RANSAC, motion vectors which do not agree with the majority model may be rejected resulting in a set of indices according to the following:

$$G_{outliers} \subseteq \{1,2,\ldots,N\}$$

wherein motion vectors with indices in the set do not agrees with the majority model $T_{global}$.

A new transformation may then be determined, wherein the points in $G_{outliers}$ may be registered. The group of outliers that do not agree with the model be characterized as:

$$G_{outliers}^{local} \subseteq G_{outliers}$$

When the model is statistically significant, the group would be relatively large. Based on this model, the alignment may be considered a failure due to local motion when:

$$|G_{outliers}^{local}|/|G_{outliers}| > \theta$$

for some predetermined threshold $\theta$, which is set by observing the ratio in known data (e.g., training). According to one embodiment, in that state, a misalignment error may be detected.

Accordingly, process 400 may check for a misalignment error at block 415. When a misalignment error is not detected (e.g., "NO" path out of decision block 415), process 400 may proceed with enhancement of imaging data at block 420. When a misalignment error is detected (e.g., "YES" path out of decision block 415), a result may be determined to abort enhancement of image data at block 425.

Figure 5:
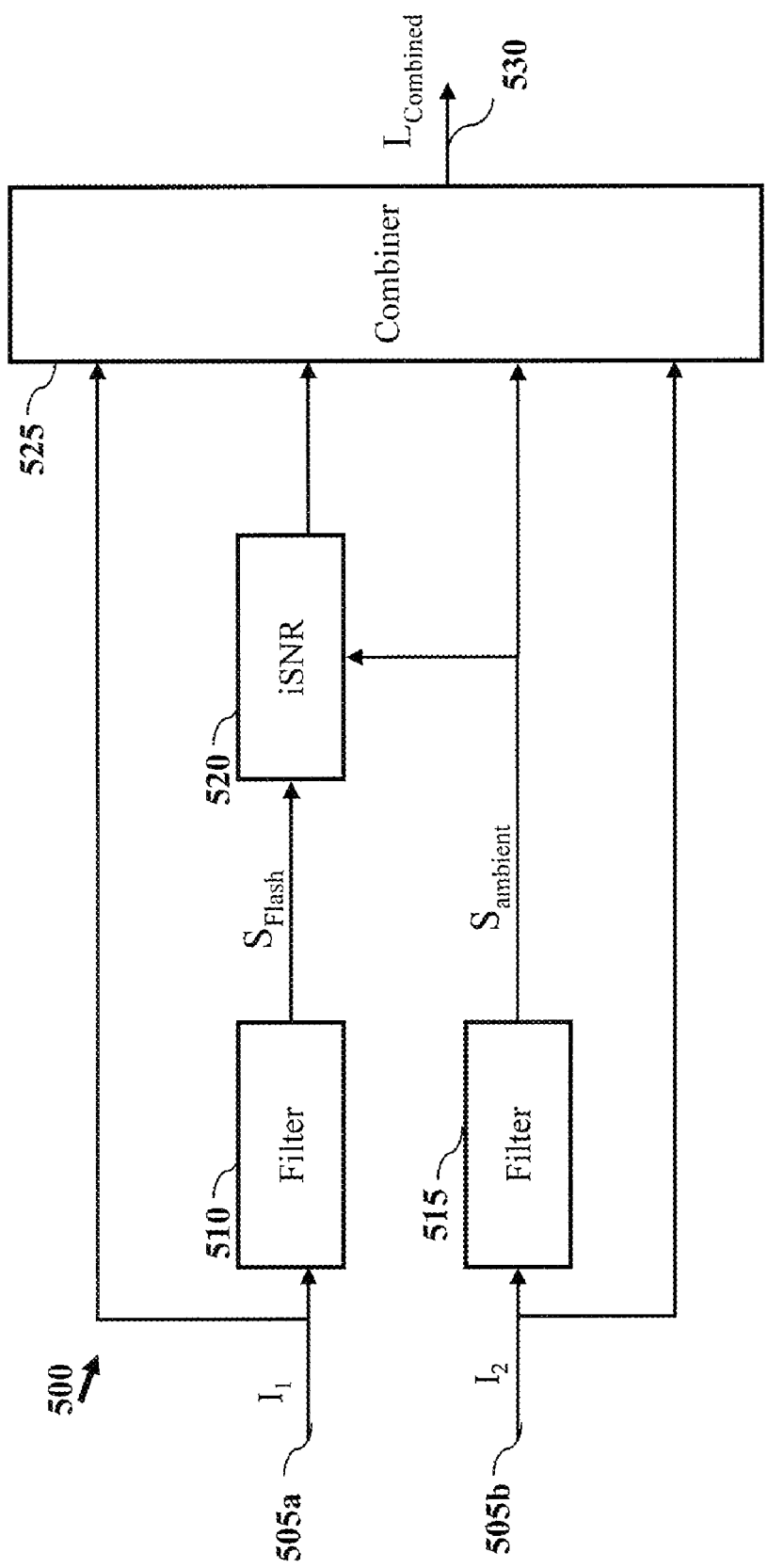
FIG. 5 depicts a graphical representation of combining image data according to one embodiment of the invention.

Referring now to FIG. 5, a process is depicted for calculating a combined image according to one embodiment of the invention. Process 500 may be employed to combine image data associated with a first image associated with an ambient light level, and a second image associated with artificial light emitted by the imaging device during capture. Process 500 may begin by receiving image data, depicted as 505a and 505b, for an image associated with artificial illumination and image data associated with ambient light, respectively. Received image data, 505a and 505b, may be filtered by filters 510 and 515. In one embodiment, filters 510 and 515 relate to edge preserving smoothing filters (EPSF). Ambient image values (e.g., $L_{ambient}$) and the flash image values (e.g., $L_{flash}$), may be filtered to produce $S_{ambient}$=Filter$\{L_{ambient}\}$, and $S_{flash}$=Filter$\{L_{ambient}\}$.

According to one embodiment, digital image acquisition for a captured pixel response L from pixel illumination E, can be expressed as:

$$L = E + n(0,E) + n(0,\sigma_D^2)$$

wherein n(m,s) is a stochastic process with variance s and mean m. n(0,E) relates to the shot noise which is proportional to the root of the signal level, while $(n, \sigma_D^2)$ is sensor noise, or dark noise which is not dependent of the signal level E.

For many imaging devices, analog gain G is applied to the readout L before it is digitized as follows;

$$L = (E + n(0,E) + n(0,\sigma_D^2)) \cdot G$$

Defining illumination S as S=EG, the output may be characterized as follows:

$$L = \left(\frac{S}{G} + n\left(0, \frac{S}{G}\right) + n(0, \sigma_D^2)\right) \cdot G$$

In order to establish a statistical framework, the signal may be represented as a random signal n(S, F(S)):

$$L = \left(\frac{n(S, F(S))}{G} + n\left(0, \frac{S}{G}\right) + n(0, \sigma_D^2)\right) \cdot G$$

Wherein F(S) is the desired detail layer in the image, it is the dependent on the statistics of each image. However, any F function must follow the constraints: F(0)=0, as a zero signal has zero details, due to the quantization limit. F(1)=0 as a saturated signal also cannot hold any detail, that is the saturation limit.

The variance of the captured pixel response, assuming that an image level S the different noise component and the image details are independent can be referred to as:

$$\text{var}L = \underbrace{F(S)}_{signal} + \underbrace{GS + G^2\sigma_D^2}_{noise}$$

Signal to noise ratio (SNR) is a good metric of perceptual quality of the detail layer. Based on the above-identifier variance formulation, SNR may be characterized as follows:

$$SNR \triangleq \frac{\sigma_{signal}}{\sigma_{noise}} = \sqrt{G^{-1}\frac{F(S)}{S + G\sigma_D^2}}$$

wherein G and $\sigma_D$ are known parameters, and F(S) may be experimentally determined. Accordingly, the SNR quotient function may be characterized as follows:

$$qSNR(S_{flash}, S_{ambient}) = \frac{SNR_{flash}(S_{flash})}{SNR_{ambient}(S_{ambient})} =$$
$$= \sqrt{\frac{G_{ambient}}{G_{flash}} \cdot \frac{S_{ambient} + G_{ambient}\sigma_D^2}{S_{flash} + G_{flash}\sigma_D^2} \cdot \frac{F(S_{flash})}{F(S_{ambient})}}.$$

In one embodiment, an optimal flash and non-flash image may be composed by selecting a detail layer based on the qSNR function. By way of example, for each pixel qSNR may be determined wherein detail replacement will be carried out when the value is greater than 1, and detail replacement may be bypassed and the pixel will keep ambient details. One advantage of calculating a qSNR may be to detect artifacts. Shadows may be efficiently removed in particular areas where the SNR of the ambient image is larger than the SNR of the flash image. Flash specularities will be removed since, in those areas, the flash illumination level nears saturation and F(.) (hence, flash SNR) drops to zero According to another embodiment, the qSNR function may be optimized as the function may be difficult to evaluate in a real-time environment. In certain instances, the qSNR function may not be particularly meaningful, only whether the value is below or above the value of 1. For example, as expressed in the iSNR function:

$$iSNR(S_{flash}, S_{ambient}) = \begin{cases} 1 & qSNR(S_{flash}, S_{ambient}) > 1 \\ 0 & \text{otherwise} \end{cases}$$

One solution of the invention includes that the iSNR function can, in turn be approximated. For example, multiple threshold linear functions may be employed. A linear threshold function (LIN) may relate to a 3-vector (a,b,c) function as follows:

$$LIN(S_{flash}, S_{ambient}) = \begin{cases} 0 & a \cdot S_{flash} + b \cdot S_{ambient} + c > 0 \\ 1 & \text{otherwise} \end{cases}$$

Figure 6:
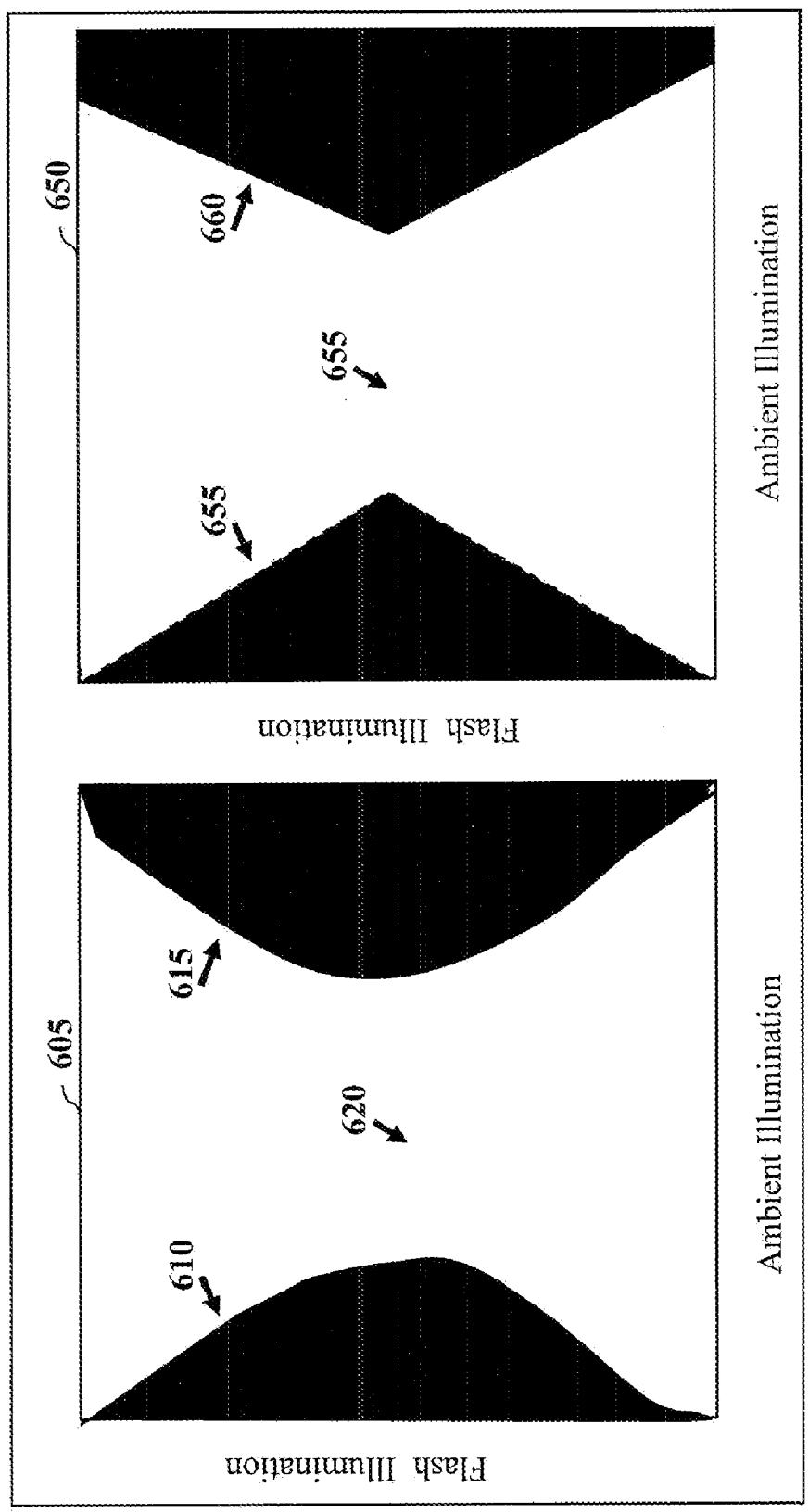
FIG. 6 depicts a graphical representation of approximating signal-to-noise ratio according to one embodiment of the invention.

One advantage of the linear threshold function may be the ability to evaluate in real-time. The iSNR approximation may thus be characterized as:

$$iSNR(S_{flash}, S_{ambient}) = \bigcup_{i=1}^{M} \bigcap_{j=1}^{N_i} LIN_{i,j}(S_{flash}, S_{ambient})$$

Wherein the union and intersection operators represent logical OR and AND operators respectively (e.g., 1 OR 0=1, 0 OR 0=0). iSNR function 520 of FIG. 5 may relate to the above formulation. As will be discussed in more detail below, FIG. 6 depicts a graphical representation of approximating the iSNR function.

Combiner 525 may be configured to combine image data as processed by the iSNR function in combination with image data associated with a flash image 505a and ambient image 505b. Combination of image data may be based on details of the flash image and/or ambient image data. A combined image may be output via output 530. As will be discussed below, image data 530 may further include output of a tone rendered result.

According to another embodiment, perceived brightness of a real world object can generally be characterized as:

$$L = S \cdot R$$

wherein S relates to the illumination (which depends only on the light source) and R relates to the reflectance (which depends only on the object being observed).

In one embodiment, illumination may be assumed to be constant, as it is relatively slow changing in space, when it meets the edges of objects. Accordingly, edge-preserving smoother filtering (e.g., filters 510 and 515) may provide the illumination S for an image wherein the extrinsic details of an image may be extracted as follows:

$$R = \frac{L}{\text{Filter}\{L\}}$$

The method of detail replacement in the combined image, of the prior art, is usually performed by:

$$L_{combined} = \frac{L_{flash}}{\text{Filter}\{L_{flash}\}} \cdot \text{Filter}\{L_{ambient}\}$$

The aforementioned approach is impractical for some applications, such as mobile or imbedded implementations. However, applying a logarithmic function allows for a linear equation characterized as:

$$L_{initial} = \exp[\log(L_{flash}) - \log(\text{Filter}\{L_{flash}\}) + \log(\text{Filter}\{L_{ambient}\})]$$

According to one embodiment, each image pixel may be represented by 8 bits, and the logarithmic function may be may be compared with a look-up-table to directly translate each of the 256 possible images values to a logarithmic value. The exponential (exp) function can also be evaluated via look-up-table if the base and precision of the log function is chosen correctly (e.g., base 2 and precision of 12 bits). The look-up-table may be provided by a processor (e.g., processor 105) of the imaging device. Accordingly, the combined pixel response may be determined as follows;

$$L_{combined} = \begin{cases} L_{initial} & \overline{iSNR}(S_{flash}, S_{ambient}) = 1 \\ L_{ambient} & \text{otherwise} \end{cases}$$

Combined image data based on the above-identified format may correct for noise and to add missing detail, however may appear to many viewers as having an unnatural appearance. Some conventional methods of blending image data to obtain a continuous flash effect. However, this approach is non-selective and can result in many regions of the image having correction reduced and/or reproducing image data inaccurately.

According to one embodiment of the invention, and in contrast to conventional methods of blending image data, one or more regions form a flash image may be employed to correct for visually unpleasant regions of image data in the combined image by combiner 525. For example, areas in which the ambient illumination is very low, and thus unreliable to estimate, may be replaced with data from the flash image. In one embodiment, the value of each composited pixel may be described as:

$$L_{composited} = L_{flash} M_{compositing} + L_{combined}(1 - M_{compositing})$$

Where:

$$M_{compositing} = Q_{ambient}(S_{ambient}) \cdot Q_{flash}(S_{flash})$$

Figure 7:
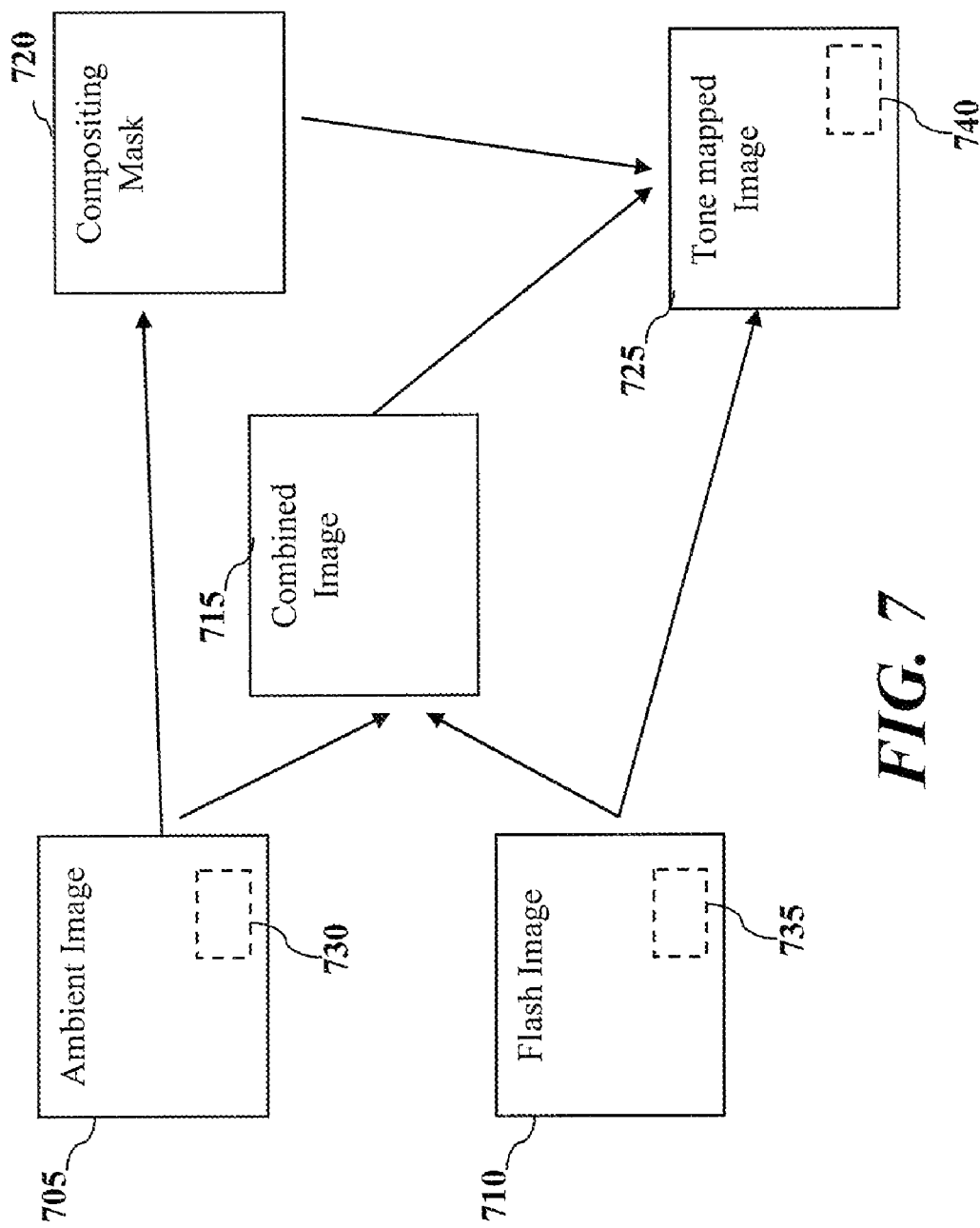
FIG. 7 depicts a graphical representation of blending image data according to one embodiment of the invention.

According to one embodiment, the Q functions may be chosen through subjective testing to optimize tone rendering for image data. FIG. 7 depicts a graphical representation of image blending which may be employed by combiner 525 according to one embodiment.

Referring now to FIG. 6, a graphical representation is depicted of approximating the iSNR function. Graph 605 depicts an iSNR function, wherein dark regions, shown by 610 and 615, relate to a value of 0, and bright regions, shown by 620, relate to a value of 1. Graph 650 relates to an approximation of iSNR as may be employed for combining image data according to one embodiment of the invention. As depicted, dark regions of graph 650, shown by 655 and 660, relate to a value of 0, and bright region, shown by 665, relates to a value of 1. Graph 650 depicts a piecewise linear function containing two groups of two lines each according to one embodiment. It may be appreciated that the approximated iSNR function 650 may be employed for low-light image enhancement according to one embodiment of the invention.

FIG. 7 depicts a graphical representation of image blending according to one embodiment. Image blending as depicted in FIG. 7 may be employed by the combiner of FIG. 5 according to one embodiment. As depicted, a first image, ambient image 705 and second image, flash image 710, may be employed to generate combined image 715. Combined image 715 may relate to a composed image, wherein the image is corrected for artifacts. Compositing mask 720 may be generated based on image data associated with the ambient image 705 and a Q function (e.g., Q function described in reference to FIG. 5). In one embodiment, image data associated with flash image 710 and combined image 715 may be blended based, at least in part, on compositing mask 720 to generate tone mapped image 725. In certain embodiments, portions of ambient image, shown as 730, and flash image, shown as 735 may be employed to correct for one or more portions of combined image 715 resulting in enhanced image data for a blended image, shown as 740 of tone mapped image 725. In that fashion, low-light image enhancement may be provided for an imaging device according to one embodiment.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. A method for low-light imaging enhancement by a digital imaging device, the method comprising the acts of:
    detecting an image, by the digital imaging device, associated with ambient lighting of a scene;
    detecting an image, by the digital imaging device, associated with artificial lighting of the scene;
    aligning the image associated with ambient lighting relative to the image associated with artificial lighting based on a motion parameter of ambient lighting image data and artificial lighting image data;
    calculating data for a combined image based on aligned ambient lighting image data and artificial lighting image data, wherein the image data of either the aligned ambient lighting image or the artificial lighting image is selected for each pixel of the combined image to maximize a signal to noise ratio of the combined image;
    determining an image parameter based on the ambient lighting image data;
    blending the image data associated with the artificial lighting image and the combined image based on the image parameter to generate a tone rendered image; and
    storing, by the digital imaging device, the tone rendered image.

2. The method of claim 1, wherein the image associated with ambient lighting relates to lower resolution preview image data detected by the imaging device having a lower resolution than a resolution of the image associated with artificial lighting.

3. The method of claim 1, wherein the image associated with artificial lighting relates to a full resolution image with a lower gain than a gain of a full resolution image associated with ambient lighting.

4. The method of claim 1, wherein the image associated with ambient lighting is detected prior to detection of the image associated with artificial lighting.

5. The method of claim 1, wherein the image associated with artificial lighting is detected prior to detection of the image associated with ambient lighting.

6. The method of claim 1, wherein the motion parameter relates to a global alignment of the ambient lighting image data and artificial lighting image data based on inverse motion.

7. The method of claim 1, wherein aligning is based on an alignment parameter of an alignment transformation applied to image data associated with the regions of interest of the ambient lighting image data.

8. The method of claim 1, wherein the combined image rotates to a composite image based on local illumination of each pixel.

9. The method of claim 1, wherein the image parameter relates to a composite mask determined based a tone rendering function.

10. The method of claim 1, wherein blending image data corrects for flatness of image data associated with artificial illumination.

11. The method of claim 1, wherein blending relates to blending image data from the artificial lighting image where image data associated with the ambient lighting image is hard to estimate.

12. The method of claim 1, further comprising filtering image data of the ambient lighting and artificial lighting images based on an edge preserving smoothing filter.

13. The method of claim 1, further comprising amplifying image data based on minimal digital gain for a balanced exposure of image data.

14. The method of claim 1, further comprising detecting an alignment error, and aborting enhancement of image data based on the alignment error.

15. The method of claim 14, further comprising capturing an additional image associated with ambient lighting of the scene, and an additional image associated with artificial lighting of the scene based on the alignment error.

16. A device configured for low-light imaging enhancement, the device comprising:
    an image sensor configured to capture image data of the scene; and a processor coupled to the image sensor, the processor configured to
    detect an image associated with ambient lighting of the scene;
    detect an image associated with a artificial lighting of the scene;
    align the image associated with ambient lighting relative to the image associated with artificial lighting based on a motion parameter of ambient lighting image data and artificial lighting image data;
    calculate data for a combined image based on aligned ambient lighting image data and artificial lighting image data, wherein the image data of either the aligned ambient lighting image or the artificial lighting image is selected for each pixel of the combined image to maximize a signal to noise ratio of the combined image;
    determine an image parameter based on the ambient lighting image data;
    blend the image data associated with the artificial lighting image and the combined image based on the image parameter to generate a tone rendered image; and
    store the tone rendered image.

17. The device of claim 16, wherein the image associated with ambient lighting relates to lower resolution preview image data detected by the imaging device having a lower resolution than a resolution of the image associated with artificial lighting.

18. The device of claim 16, wherein the image associated with artificial lighting relates to a full resolution image with a lower gain than a gain of a full resolution image associated with ambient lighting.

19. The device of claim 16, wherein the image associated with ambient lighting is detected prior to detection of the image associated with artificial lighting.

20. The device of claim 16, wherein the image associated with artificial lighting is detected prior to detection of the image associated with ambient lighting.

21. The device of claim 16, wherein the motion parameter relates to a global alignment of the ambient lighting image data and artificial lighting image data based on inverse motion.

22. The device of claim 16, wherein aligning is based on the alignment parameter of an alignment transformation applied to image data associated with the regions of interest of the ambient lighting image data.

23. The device of claim 16, wherein the combined image relates to a composite image based on local illumination of each pixel.

24. The device of claim 16, wherein the image parameter relates to a composite mask determined based a tone rendering function.

25. The device of claim 16, wherein blending image data corrects for flatness of image data associated with artificial illumination.

26. The device of claim 16, wherein blending relates to blending image data from the artificial lighting image where image data associated with the ambient lighting image is hard to estimate.

27. The device of claim 16, wherein the processor is further configured to filter image data of the ambient lighting and artificial lighting images based on an edge preserving smoothing filter.

28. The device of claim 16, wherein the processor is further configured to amplify image data based on minimal digital gain for a balanced exposure of image data.

29. The device of claim 16, wherein the processor is further configured to detect an alignment error, and abort enhancement of image data based on the alignment error.

30. The device of claim 29, wherein the processor is further configured to detect additional image associated with ambient lighting of the scene, and an additional image associated with artificial lighting of the scene based on the alignment error.

* * * * *